No. 765,192. PATENTED JULY 19, 1904.
T. OTT.
GLASS DECORATION WITH FLAT SURFACE.
APPLICATION FILED DEC. 1, 1903.
NO MODEL.

WITNESSES
H. M. Kuehne
John A. Percival

INVENTOR
Theodore Ott
BY Richardson
ATTORNEYS

No. 765,192. Patented July 19, 1904.

UNITED STATES PATENT OFFICE.

THEODORE OTT, OF STRASBURG, GERMANY.

GLASS DECORATION WITH FLAT SURFACE.

SPECIFICATION forming part of Letters Patent No. 765,192, dated July 19, 1904.

Application filed December 1, 1903. Serial No. 183,399. (No model.)

*To all whom it may concern:*

Be it known that I, THEODORE OTT, a subject of the Emperor of Germany, residing at Strasburg, Alsace-Lorraine, Germany, have made certain new and useful Improvements in Glass Decorations, of which the following is a specification.

The object of the present invention consists of a special decoration consisting of various kinds of glass variously colored with metallic insertions adapted for sign-boards, wall decorations, and the like. The metallic insertion is protected by means of an insulating layer of wax, asphalt, tar, oil, fat, or the like to protect and preserve the metal. A mass of suitable cementing material—such as gypsum, cement, putty, or the like—holds the pieces of glass firmly together and forms at the same time a support. The surface of the plane of the glass is continuous, and the metallic insertion is depressed to form angles below the plane of the glass surface, so that there will also be produced a distribution of the light-rays.

Figure 1:
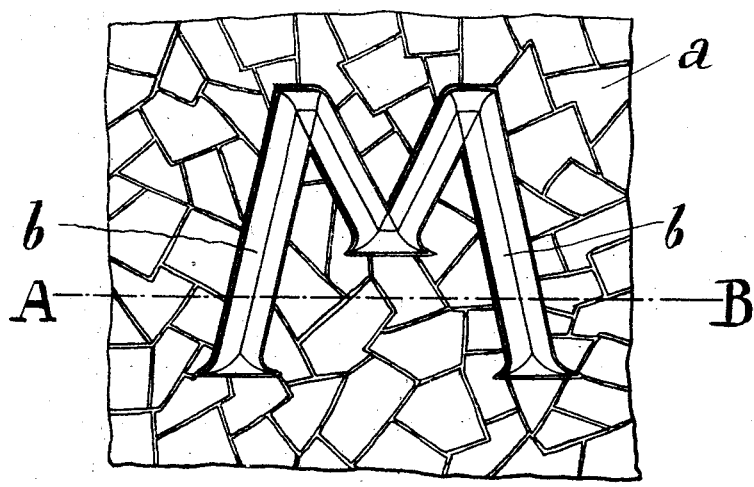
Figure 2:
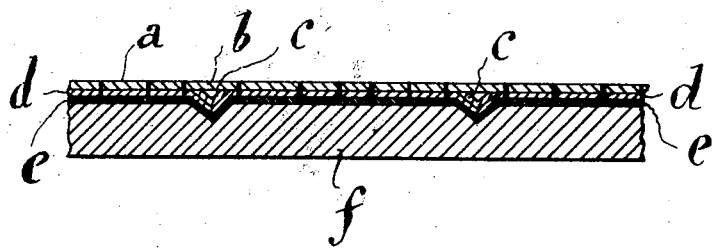

Figure 1 shows a front elevation of a decoration having recessed parts and flat surface. Fig. 2 shows a section on the line A B of Fig. 1.

The glass decoration consists of a number of variously shaped and colored glasses $a$, arranged together, which are cut into the required shapes and are put together in the required pattern and on the same plane. The surface $a\ b$ of the glass is entirely flat, and the metal insertions $d$ are depressed at required places which have a special effect above the glass surface, so that this remains transparent at these required places $b$. The whole metal insertion $d$ is protected by an insulating layer $e$, and the entire decoration is held together by the frame $f$. The reflecting effect of the metal insertion $d$ is still further increased by placing a transparent material $c$ of various colors over the metal insertion in these places under the transparent glass $b$. The magnifying effect of the glass surface over the reflecting parts beneath $b$ is so that these parts appear larger than they really are.

Having now described my invention, I declare that what I claim is—

1. In a glass decoration, the combination with a plane glass surface and a metal insertion beneath the same, of depressions in said metal insertion forming recesses beneath the glass surface, substantially as described.

2. In a glass decoration, the combination with a plane glass surface and metal insertions beneath the same, of depressions in said metal insertions forming recesses beneath the glass surface and transparent coloring material within said recesses, substantially as described.

3. In a glass decoration, the combination with a glass surface and metal insertions beneath the same, of angular depressions in said metal insertions forming recesses beneath said glass surface, substantially as described.

In witness whereof I have hereunto set my hand in presence of two witnesses.

THEODORE OTT.

Witnesses:
SIEGFRIED HAUSER,
GUSTAV SCHWEIN.